(12) United States Patent
Kießling et al.

(10) Patent No.: US 10,534,205 B2
(45) Date of Patent: Jan. 14, 2020

(54) APPARATUS AND METHOD FOR GENERATING ELECTROMAGNETIC RADIATION

(71) Applicant: HÜBNER GmbH & Co. KG, Kassel (DE)

(72) Inventors: Jens Kießling, Freiburg (DE); Ingo Breunig, Freiburg (DE); Frank Kühnemann, Freiburg (DE)

(73) Assignee: HÜBNER GmbH & CO. KG, Kassel (DE)

( * ) Notice: Subject to any disclaimer, the term of this patent is extended or adjusted under 35 U.S.C. 154(b) by 304 days.

(21) Appl. No.: 15/532,142

(22) PCT Filed: Nov. 30, 2015

(86) PCT No.: PCT/EP2015/078080
§ 371 (c)(1),
(2) Date: Jun. 1, 2017

(87) PCT Pub. No.: WO2016/087380
PCT Pub. Date: Jun. 9, 2016

(65) Prior Publication Data
US 2017/0269389 A1  Sep. 21, 2017

(30) Foreign Application Priority Data
Dec. 5, 2014 (DE) .......... 10 2014 017 931

(51) Int. Cl.
*G02F 1/01* (2006.01)
*G02F 1/35* (2006.01)
(Continued)

(52) U.S. Cl.
CPC .......... *G02F 1/0121* (2013.01); *G02F 1/3501* (2013.01); *G02F 1/3534* (2013.01);
(Continued)

(58) Field of Classification Search
CPC .... G02F 1/0121; G02F 1/3501; G02F 1/3534; G02F 1/37; G02F 1/39; G02F 2001/3507
See application file for complete search history.

(56) References Cited

U.S. PATENT DOCUMENTS

| 4,019,159 A * | 4/1977 | Hon .......................... G02F 1/37 359/278 |
| 5,867,303 A | 2/1999 | Mohatt et al. |

(Continued)

FOREIGN PATENT DOCUMENTS

CN  102749784 A  * 10/2012  .............. G02F 1/39

OTHER PUBLICATIONS

K. Devi, Thesis: "Continuous-wave optical parametric oscillators and frequency conversion sources from the ultraviolet to the mid-infrared", Institut de Ciències Fotòniques, May 2013.
(Continued)

*Primary Examiner* — Daniel Petkovsek
(74) *Attorney, Agent, or Firm* — Drinker Biddle & Reath LLP (57) ABSTRACT

An apparatus for generating electromagnetic radiation includes a pump laser so adapted that in operation of the apparatus it generates electromagnetic continuous-wave pump radiation; an optical parametric oscillator which is arranged in the beam path of the pump radiation and has a non-linear optical crystal, and is so adapted that in operation of the apparatus it generates signal and idler radiation from the pump radiation, and a non-linear optical device having a non-linear optical crystal, being arranged at least in a beam path of the signal radiation or idler radiation, and being so adapted that in operation of the apparatus it generates from the signal or idler radiation electromagnetic radiation at a frequency greater than a frequency of the signal or idler radiation. The non-linear optical crystal being heated in a
(Continued)

furnace so that the crystal has a temperature gradient in the beam direction of the signal or idler radiation.

24 Claims, 4 Drawing Sheets

(51) Int. Cl.
    *G02F 1/37*     (2006.01)
    *G02F 1/39*     (2006.01)
    *H01S 3/23*     (2006.01)

(52) U.S. Cl.
    CPC .................. *G02F 1/37* (2013.01); *G02F 1/39* (2013.01); *H01S 3/2383* (2013.01)

(56) References Cited

U.S. PATENT DOCUMENTS

| | | | |
|---|---|---|---|
| 5,898,718 A | 4/1999 | Mohatt et al. | |
| 9,362,716 B2 * | 6/2016 | Swanbeck | H01S 3/094003 |
| 2005/0163187 A1 * | 7/2005 | Spinelli | H01S 3/083 372/94 |
| 2008/0056642 A1 * | 3/2008 | Byer | G02B 6/4296 385/27 |

OTHER PUBLICATIONS

R.W.P. Drever et al., "Laser Phase and Frequency Stabilization Using an Optical Resonator", Appl. Phys. B, vol. 31, 1983, p. 97-p. 105.

A. Hecker et al., "High resolution Doppler-free spectroscopy of molecular iodine using a continuous wave optical parametric oscillator", Optics Communications, vol. 218, 2003, p. 131-p. 134.

K. Regelskis et al., "Efficient second-harmonic generation of broadband radiation by control of the temperature distribution along a nonlinear crystal", Optics Express, vol. 20, No. 27, Dec. 2012, p. 28544-p. 28556.

* cited by examiner

APPARATUS AND METHOD FOR GENERATING ELECTROMAGNETIC RADIATION

CROSS REFERENCE TO RELATED APPLICATIONS

This application is a National Stage of International Application No. PCT/EP2015/078080 filed Nov. 30, 2015, which claims benefit of German Patent Application No. 10 2014 017 931.1 filed Dec. 5, 2014, both of which are herein incorporated by reference in their entirety.

The present invention concerns an apparatus for generating electromagnetic radiation comprising a pump laser so adapted that in operation of the apparatus it generates electromagnetic continuous-wave pump radiation, an optical parametric oscillator having a non-linear optical crystal, wherein the optical parametric oscillator is arranged in a beam path of the pump radiation, and wherein the optical parametric oscillator is so adapted that in operation of the apparatus it generates signal radiation and idler radiation from the pump radiation, and a non-linear optical device having a non-linear optical crystal, wherein the non-linear optical device is arranged at least in a beam path of the signal radiation or idler radiation, wherein the non-linear optical device is so adapted that in operation of the apparatus it generates from the signal radiation or idler radiation electromagnetic radiation at a frequency greater than a frequency of the signal radiation or idler radiation.

The present invention also concerns a method of generating electromagnetic radiation comprising the steps: generating electromagnetic continuous-wave pump radiation with a pump laser, generating signal radiation or idler radiation from the pump radiation in an optical parametric oscillator having a non-linear optical crystal, and generating electromagnetic radiation at a frequency which can be greater than a frequency of the signal radiation or idler radiation from the signal radiation or idler radiation in a non-linear optical device having a non-linear optical crystal.

Many wavelength ranges or frequency ranges of electromagnetic radiation, that are of interest in terms of scientific and technical applications, cannot be generated or can be only generated with difficulty directly by efficient lasers. Rather, those wavelength ranges have to be generated by non-linear optical frequency conversion from a pump radiation generated by means of a laser.

A wide-spread approach for that purpose involves so-called optical parametric oscillators in which signal radiation and idler radiation which are tunable in wavelength are generated from a predetermined, typically fixed pump wavelength. In that case, in the non-linear optical crystal, a photon of the pump radiation is respectively divided into two photons of the signal radiation and the idler radiation, which together have the energy of the photon of the pump radiation. Therefore in that non-linear optical process it is only possible to produce wavelengths which are greater than the wavelength of the pump radiation used.

Wavelengths shorter than the wavelength of the pump radiation used can only be generated in a second step by a procedure whereby, in a further non-linear optical crystal, for example doubling of the wavelength of the signal radiation or the idler radiation is effected, or frequency summing is effected from the pump radiation and the signal radiation or idler radiation.

In that respect the aim of such systems, at the end of such a two-stage process, is to generate an electromagnetic radiation tunable in automated fashion over a wide wavelength range, in a wavelength range which is not directly accessible with lasers. That signifies inter alia that no manual correction or re-adjustment steps should be required in operation. Such correction and adjustment steps are however necessary for example when tilting of the non-linear optical crystals is required for phase adaptation to achieve such a wide tuning range.

In the technical language used in the present application the optical parametric oscillator is abbreviated to OPO, a frequency doubler is abbreviated to SHG (in English Second Harmonic Generation), and a sum frequency generator is abbreviated to SFG (in English Sum Frequency Generation). SHG and SFG as alternative examples for generating frequencies greater than the frequency of the radiation generated in the OPO are identified jointly by the term "non-linear optical device". In that respect, strictly speaking, this is an additional second non-linear optical device as the OPO is also based on non-linear optical phenomena.

Taking the state of the art as the basic starting point the object of the present invention is to provide an apparatus for generating electromagnetic radiation, wherein the radiation generated can be tuned automatedly without adjustment implementation over a wide wavelength range.

For that purpose the invention aims to provide an OPO which permits generation which is as wide-band and efficient as possible of signal radiation and idler radiation from the pump radiation.

Another object of the present invention is to provide frequency conversion with controllable conversion efficiency in the non-linear optical device in order also to optimise the power of the radiation which at the end issues as useful radiation from the apparatus for generating electromagnetic radiation.

Finally the invention also seeks to tune the OPO and the non-linear optical device to each other.

At least one of the above-mentioned objects is achieved by an apparatus for generating electromagnetic radiation comprising a pump laser so adapted that in operation of the apparatus it generates electromagnetic continuous-wave pump radiation, an optical parametric oscillator having a non-linear optical crystal, wherein the optical parametric oscillator is arranged in a beam path of the pump radiation, and wherein the optical parametric oscillator is so adapted that in operation of the apparatus it generates signal radiation and idler radiation from the pump radiation, and a non-linear optical device having a non-linear optical crystal, wherein the non-linear optical device is arranged at least in a beam path of the signal radiation or idler radiation, wherein the non-linear optical device is so adapted that in operation of the apparatus it generates from the signal radiation or idler radiation electromagnetic radiation at a frequency greater than a frequency of the signal radiation or idler radiation, and wherein the non-linear optical crystal of the non-linear optical device is arranged in a furnace which is so designed that in operation of the apparatus it heats the crystal in such a way that the crystal has a temperature gradient in the beam direction of the signal radiation or idler radiation.

In an embodiment of the present invention, a diode-pumped, frequency-doubled solid-state laser, for example at a wavelength of 532 nm, or a frequency-doubled fibre-laser, is used as the pump laser.

The non-linear optical device is an additional device of the apparatus, that is to be distinguished from the OPO. It serves to subject the signal radiation or idler radiation generated from the pump radiation by the OPO to a further frequency conversion operation so that the frequency of the electromagnetic radiation resulting therefrom is greater than the frequency of the signal radiation or idler radiation from the OPO and is preferably also greater than the frequency of the pump radiation emitted by the pump laser.

Therefore for example a frequency doubler or a sum frequency generator is suitable as the non-linear optical device.

In an embodiment of the invention the non-linear optical device is a frequency doubler having a non-linear optical crystal, wherein the frequency doubler is arranged in a beam path of the signal radiation or idler radiation, and wherein the frequency doubler is so adapted that in operation of the apparatus it generates electromagnetic radiation at double the frequency of a frequency of the signal radiation or idler radiation, from the signal radiation or idler radiation.

In the embodiment which is an alternative thereto the non-linear optical device is a sum frequency generator having a non-linear optical crystal, wherein the sum frequency generator is arranged in a beam path of the signal radiation or idler radiation and in a beam path of the pump radiation, and wherein the sum frequency generator is so adapted that in operation of the apparatus it generates from the signal radiation or idler radiation and the pump radiation electromagnetic radiation at a frequency equal to the sum of a frequency of the signal radiation or idler radiation and a frequency of the pump radiation.

In contrast to the SHG the SFG requires a part of the pump radiation generated by the pump laser to be branched off before the pump radiation passes into the OPO to operate the SFG with that branched-off component of the pump radiation. In exchange a higher output power of the generated electromagnetic radiation is possibly available downstream of the SFG.

All aspects discussed in the present application in respect of the non-linear optical device, unless explicitly stated otherwise, concern both the SHG and also the SFG.

It will be appreciated that at least in an embodiment of the invention the non-linear optical device, besides the non-linear optical crystal, has a resonator which is so designed that it is resonant for the signal radiation or idler radiation generated in the OPO.

In an embodiment of the invention the wavelength of the signal radiation or idler radiation from the OPO, issuing from the resonator, can be tuned by the non-linear optical crystal of the OPO being arranged in a furnace so that the temperature at which the crystal is in operation of the apparatus can be adjusted and selected. The wavelengths of signal radiation and idler radiation are determined by the temperature of the crystal.

It is found that the output power of signal radiation and idler radiation of the OPO is a function of the wavelength. In that respect, expressed in simplified terms, the power decreases with increasing wavelength. Therefore, the efficiency of frequency conversion in the non-linear optical device (for example SHG or SFG) is to be matched to the power of the signal radiation or idler radiation generated by the OPO.

In an embodiment that matching is effected in such a way that the output power of the non-linear optical device is as constant as possible over a wavelength range which is as great as possible.

In a further embodiment of the invention the efficiency of frequency conversion in the non-linear optical device is so adapted that, for each wavelength of the signal radiation or idler radiation pumping the non-linear optical device, stable operation of the non-linear optical device is guaranteed.

It is also possible in an embodiment to adapt the efficiency of frequency conversion in such a way that the output power of the non-linear optical device is at a maximum for each wavelength of the signal radiation or idler radiation.

The conversion efficiency of the non-linear optical device, besides the intensity of the incident signal radiation or idler radiation, depends on phase mismatching in the non-linear optical crystal of the non-linear optical device. Phase mismatching is a function of the temperature of the crystal. In that respect it has been found that phase mismatching, in particular when using poled, non-linear optical crystals, can be well adjusted by the crystal being heated by means of a furnace in such a way that the crystal has a temperature gradient in the beam direction of the signal radiation or idler radiation. By control, that is to say choice and setting, of the temperature gradient between the two ends of the crystal, it is possible to adjust what partial length of the crystal effectively contributes to frequency conversion. In that case setting or control of phase mismatching can pursue various optimisation aims as stated above.

In an embodiment of the invention therefore the apparatus for generating electromagnetic radiation has a control means operatively connected to the furnace of the non-linear optical crystal of the non-linear optical device and is so adapted that it controls the temperature gradient of the crystal of the non-linear optical device in dependence on the power and/or wavelength of the signal radiation or idler radiation incident in the crystal.

If it is assumed that, for a given structure, the output power of the signal radiation or idler radiation of the OPO is known for each achievable wavelength, then the control means only requires information about the wavelength which is set as the output wavelength of the OPO to adjust the furnace of the crystal of the non-linear optical device in such a way that its temperature gradient provides the optimum conversion efficiency of the SHG or SFG.

In an embodiment of the invention the control means is connected to a temperature sensor which is so arranged and adapted that in operation of the apparatus it detects a temperature of the crystal of the optical parametric oscillator, wherein the control means is so adapted that it controls the temperature gradient of the crystal of the non-linear optical device in dependence on the temperature of the crystal of the optical parametric oscillator.

As in an embodiment of the invention tuning of the wavelength of the signal radiation or idler radiation generated by the OPO is effected by means of a temperature control of the crystal of the OPO, the temperature thereof in such an embodiment is a direct measure in respect of the wavelength of the signal radiation or idler radiation, which is fed into the non-linear optical device for frequency conversion. In such an embodiment the temperature of the crystal of the OPO serves as a measure in respect of the wavelength of the signal radiation or idler radiation and thus—presupposing knowledge of the system—the power of the signal radiation or idler radiation.

In a further embodiment of the invention the apparatus has a control means connected to the furnace, wherein the non-linear optical crystal of the optical parametric oscillator is periodically poled and wherein the control means is so adapted that it controls the temperature gradient of the crystal of the non-linear optical device in dependence on the periodicity of the poling of the non-linear optical crystal of the optical parametric oscillator. Taking account of the periodicity of the poling of the non-linear optical crystal of the OPO in controlling the temperature gradient of the non-linear optical crystal of the non-linear optical device is advantageous for the reason that the output power of the OPO depends on the periodicity of the poled crystal.

In an embodiment of the invention the value, suited to each wavelength of the signal radiation or idler radiation, for the temperature gradient of the crystal of the non-linear optical device, is previously ascertained by experiment and an association between the wavelength of the signal or idler radiation with the respectively matching temperature gradient is laid down in a look-up table in the control means or a memory associated with same. If, in such an embodiment of the control means, the information about the wavelength of the signal radiation or idler radiation is available in some suitable form, for example in the form of the temperature of the crystal of the OPO, then the control means can adjust the temperature gradient of the non-linear optical crystal of the non-linear optical device.

In an embodiment of the invention the apparatus according to the invention further has a device for detecting a wavelength or frequency of the signal radiation or idler radiation, wherein the device for detecting the wavelength or frequency is connected to the control means.

In a further embodiment of the invention the control means is connected to a device for adjusting the wavelength of the signal radiation or idler radiation generated by the optical parametric oscillator so that in operation of the apparatus information about the wavelength of the signal radiation or idler radiation is present in the control means.

A furnace for heating the non-linear optical crystal of the non-linear optical device so that in operation of the apparatus the crystal has a temperature gradient in the beam direction of the signal radiation or idler radiation, preferably between its ends, can be of various different configurations.

In an embodiment of the invention the furnace has a first heating element and a second heating element wherein the first heating element is in thermal contact with the crystal at a first end of the crystal in the beam direction of the signal radiation or idler radiation and the second heating device is in thermal contact with the crystal at a second end of the crystal in the beam direction.

In a further embodiment of the invention the furnace has a first temperature probe and a second temperature probe, wherein the first and second temperature probes are connected to the control means, wherein the first temperature probe is so arranged and adapted that in operation of the apparatus it detects the temperature of the crystal at the first end in the beam direction of the signal radiation or idler radiation and wherein the second temperature probe is so arranged and adapted that in operation of the apparatus it detects the temperature of the crystal at a second end in the beam direction of the signal radiation or idler radiation. In that way the temperature gradient of the crystal of the non-linear optical device can be not only adjusted or subjected to open-loop control, but subjected to closed-loop control.

In an embodiment of the invention the optical parametric oscillator is of a singly resonant configuration, that is to say it has a resonator which elevates either the signal radiation or the idler radiation, that is to say is resonant for same. In that case desirably the respectively non-elevated radiation is coupled into the following non-linear optical device.

The variability of the reflection capability or transmission capability of a mirror for the signal radiation and the idler radiation in the resonator makes it possible, in an embodiment, to resonantly elevate the signal radiation or the idler radiation selectively in the resonator. In that way the tuning bandwidth of the OPO can be further increased by variability of the mirror.

In an embodiment of the invention the optical parametric oscillator has a plurality of mirrors, wherein the mirrors are so arranged and adapted that they form a resonator for the signal radiation, wherein the crystal is arranged in a beam path of the signal radiation and the idler radiation in the resonator and wherein one of the mirrors is a variable mirror so adapted that it selectively adjustably has either a reflection capability for the signal radiation greater than the reflection capability for the idler radiation and at the same time has a transmission capability for the idler radiation greater than the transmission capability for the signal radiation or a reflection capability for the idler radiation greater than the reflection capability for the signal radiation and at the same time a transmission capability for the signal radiation greater than the transmission capability for the idler radiation.

In an embodiment the variable mirror has a first portion which has a reflection capability for the signal radiation, that is greater than the refection capability for the idler radiation and at the same time a transmission capability for the idler radiation, that is greater than the transmission capability for the signal radiation, and the variable mirror has a second portion having a reflection capability for the idler radiation, that is greater than the reflection capability for the signal radiation and at the same time has a transmission capability for the signal radiation, that is greater than the transmission capability for the idler radiation, wherein the mirror is mechanically moveable in such a way that either the first portion or the second portion of the variable mirror is selectively disposed in the beam path of the signal radiation and the idler radiation.

Preferably in an embodiment of the invention both portions are arranged on the same substrate. In an alternative embodiment of the invention however the two portions of the variable mirror can be implemented on two mutually separate substrates.

In that case in an embodiment of the invention the variable mirror is moveable along a linear path in such a way that, preferably driven by an actuator, either the first portion or the second portion is disposed selectively in the beam path of the signal radiation and the idler radiation or for example the variable mirror is pivotable or rotatable about an axis of rotation in such a way that either the first portion or the second portion is disposed selectively in the beam path of the signal radiation and idler radiation.

It will be appreciated that in an embodiment of the invention the beam paths of signal radiation and idler radiation are collinear in the resonator of the OPO and/or in the resonator of the non-linear device.

In an embodiment of the invention the non-linear optical crystals of the OPO and/or the non-linear optical device are periodically poled crystals. Phase matching for a given wavelength is a function of the period of the poling and the temperature.

In an embodiment of the invention provided in the OPO and/or the non-linear optical device are a plurality of crystals which can be introduced in automated fashion and selectively alternatively into the beam path in order to increase the tuning bandwidth of the OPO and/or the non-linear optical device.

In an embodiment of the invention both the OPO and also the non-linear optical device have a resonator, wherein both resonators are actively frequency-stabilised. In that case in an embodiment frequency stabilisation of the resonator of the OPO is effected to an external reference and stabilisation of the resonator of the non-linear optical device is effected to the resonator of the OPO.

For frequency stabilisation of at least one of the two resonators, an embodiment of the invention uses the so-called Pound-Drever-Hall method (see for example Applied Physics B, Volume 31, pages 97 to 105, 1983, R. W. P. Dreyer et al: "*Laser phase and frequency stabilisation using an optical resonator*").

For that purpose in an embodiment of the invention the optical parametric oscillator and the non-linear optical device respectively have a resonator having a plurality of mirrors, wherein one of the mirrors of each of the two resonators is moveable in driven relationship by an actuator so that the lengths of the two resonators are adjustable and the resonators can be stabilised. For such stabilisation the apparatus further has a device for stabilising the resonator of the optical parametric oscillator and the resonator of the non-linear optical device. That stabilising device comprises an electrooptical modulator arranged between the two resonators in the beam path of the signal radiation or the idler radiation, a signal source which in operation of the apparatus produces a reference signal having a reference frequency, that is fed into the electrooptical modulator such that in operation of the apparatus the electrooptical modulator modulates the signal radiation or idler radiation at the resonance frequency, wherein sidebands are impressed on the signal radiation or idler radiation and wherein the frequency spacing between the signal radiation or idler radiation and the sidebands is equal to the reference frequency, a device so arranged and adapted that in operation of the apparatus it couples a part of the signal radiation or idler radiation out of the beam path upstream of the resonator of the non-linear optical device, a wavelength reference having a resonance wavelength into which in operation of the apparatus the coupled-out part of the signal radiation or idler radiation is coupled, a first detector so arranged that in operation of the apparatus it detects the intensity of the signal radiation or idler radiation reflected by the wavelength reference or the signal radiation or idler radiation transmitted by the wavelength reference, the first detector outputting a first detector signal, a first mixer into which in operation of the apparatus the first detector signal and the reference signal are fed and which mixes the first detector signal with the reference signal and outputs a first error signal, a first proportional-differential-integral controller into which in operation of the apparatus the first error signal is fed and which produces a first control signal from the first error signal, wherein in operation of the apparatus the first control signal is fed into the actuator of a mirror of the resonator of the optical parametric oscillator so that in operation of the apparatus the length of the resonator of the optical parametric oscillator is stabilised to the resonance wavelength of the wavelength reference, a device so arranged and adapted that in operation of the apparatus it couples out a part of the electromagnetic radiation circulating in the resonator of the non-linear optical device, a second detector so arranged that in operation of the apparatus it detects the intensity of the electromagnetic radiation coupled out of the resonator of the non-linear optical device, the second detector outputting a second detector signal, a second mixer into which in operation of the apparatus the second detector signal is fed, that mixes the detector signal with the reference signal and outputs a second error signal, a second proportional-differential-integral controller into which in operation of the apparatus the second error signal is fed and which produces a second control signal from the second error signal, wherein in operation of the apparatus the second control signal is fed into the actuator of a mirror of the resonator of the non-linear optical device so that in operation of the apparatus the length of the resonator of the non-linear optical device is stabilised to the resonance wavelength of the resonator of the optical parametric oscillator.

Such stabilisation reduces the use of components. It requires only a single modulator and a single driver electronic means for the modulator and no additional optical components.

In an embodiment of the invention the device for coupling out the signal radiation or idler radiation between the two resonators is a coupling-in mirror of the resonator of the non-linear optical device, more specifically at its outward side outside the actual resonator.

Likewise in an embodiment the device for coupling out the electromagnetic radiation circulating in the resonator of the non-linear optical device is formed by that coupling-in mirror of the resonator of the non-linear optical device, but that is arranged on its inward side, that is to say the surface which is reflecting for the resonator. The two radiations which are coupled out in that way do not extend in mutually collinear relationship and can be well spatially separated from each other.

In an embodiment of the invention the wavelength reference is a reference etalon, for example a temperature-stabilised Fabri-Perot etalon. Alternatively it is possible to use as the wavelength reference a gas cell filled with a gas which has absorption lines, to which the resonator of the optical parametric oscillator can be stabilised.

At least one of the above-mentioned objects is also attained by a method of generating electromagnetic radiation comprising the steps: generating electromagnetic continuous-wave pump radiation with a pump laser, generating signal radiation or idler radiation from the pump radiation in an optical parametric oscillator having a non-linear optical crystal, and generating electromagnetic radiation at a frequency greater than a frequency of the signal radiation or idler radiation from the signal radiation or idler radiation in a non-linear optical device having a non-linear optical crystal, and heating the non-linear optical crystal of the non-linear optical device in a furnace so that the crystal has a temperature gradient in the beam direction of the signal radiation or idler radiation.

Insofar as aspects of the invention have been described hereinbefore in relation to the apparatus for generating electromagnetic radiation, they also apply to the corresponding method of generating electromagnetic radiation and vice-versa. If the method is carried out with an apparatus according to the invention it has the suitable devices for that. In particular embodiments of the invention are suitable for carrying out the method according to the invention.

Further advantages, features and possible uses of the present invention will be clearly apparent from the description hereinafter of an embodiment and the accompanying drawing.

In the Figures identical elements are denoted by identical references.

Figure 1:
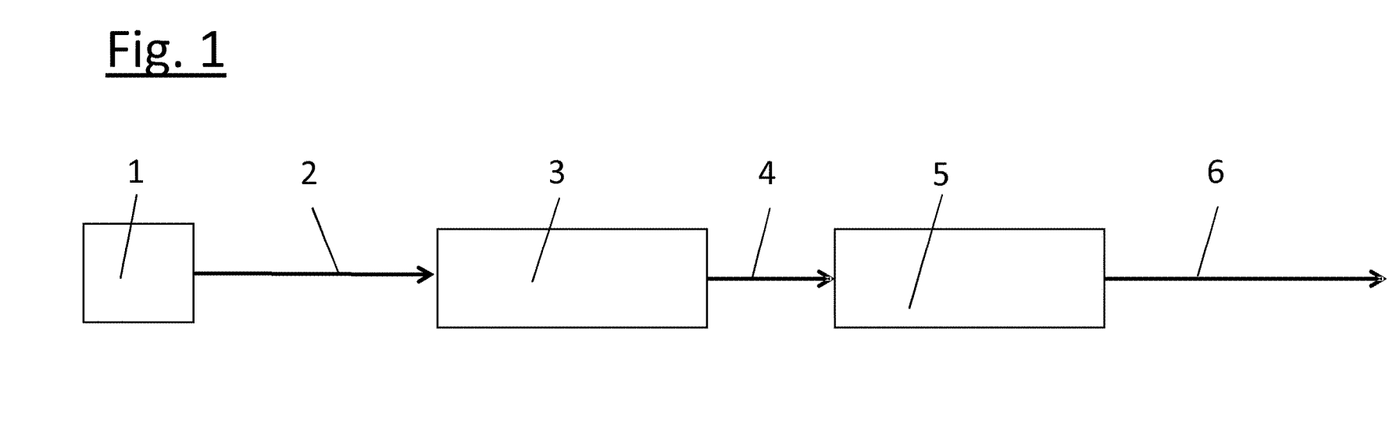
FIG. 1 shows a diagrammatic overview of an embodiment of the apparatus according to the invention for generating electromagnetic radiation.

As shown in FIG. 1 the apparatus according to the invention for generating tunable electromagnetic radiation substantially comprises three components. They are a pump laser 1, an optical parametric oscillator 3 and a frequency doubler 5 as a non-linear optical device in accordance with the present application.

In the embodiment discussed here the laser 1 is a diode-pumped frequency-doubled Nd:YVO solid-state laser. It generates an electromagnetic continuous-wave pump radiation 2 of a wavelength of 532 nm. That pump radiation is coupled into the optical parametric oscillator 3. The signal radiation or idler radiation 4 generated by the optical parametric oscillator 3 is in turn coupled into a frequency doubler 5.

While the optical parametric oscillator 3 makes it possible to generate coherent electromagnetic radiation 4 in a tunable wavelength range which is above the wavelength of the pump radiation the frequency doubler 5 halves the wavelength of the radiation 4 from the optical parametric oscillator 3.

Figure 2:
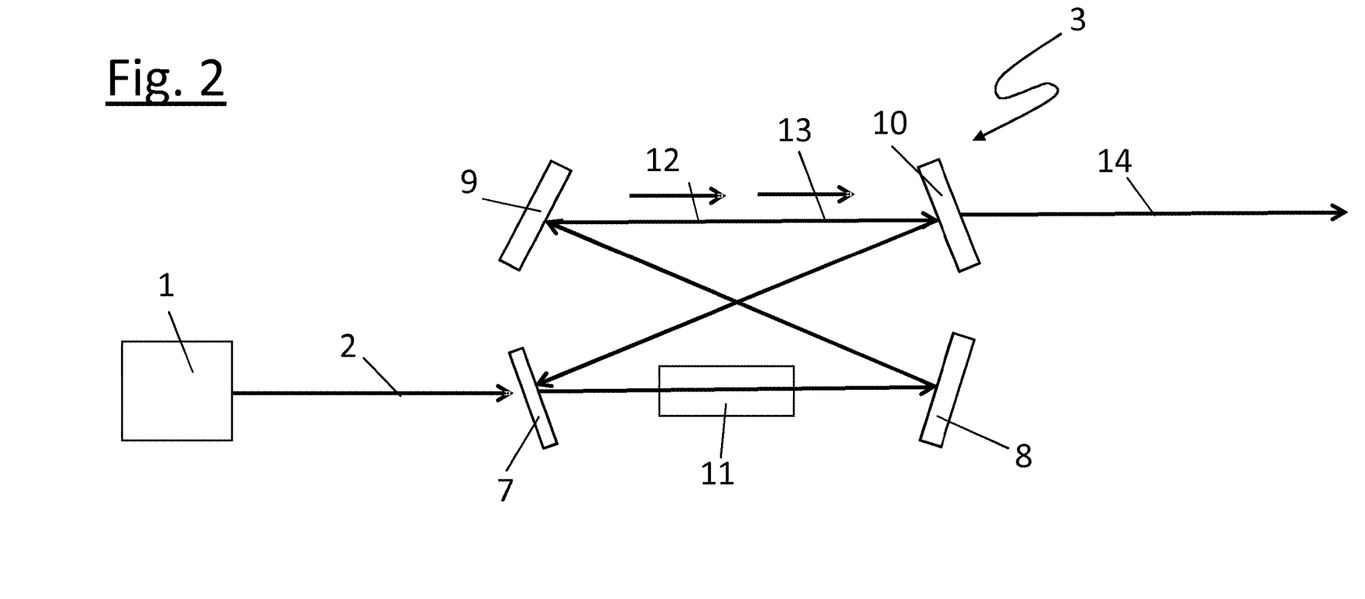
FIG. 2 shows a detail view of the laser and the optical parametric oscillator of FIG. 1.

FIG. 2 is a detail view of the optical parametric oscillator 3, also showing the pump laser 1 as well as the continuous-wave pump radiation 2 coupled into the optical parametric oscillator 3. The optical parametric oscillator 3 has a bowtie arrangement with a non-linear optical crystal 11 of lithium niobate with a periodic poling with a single lattice period. In that case the non-linear optical crystal 11 is arranged in a furnace with temperature stabilisation. The wavelength of the signal radiation or idler radiation 4 generated in the optical parametric oscillator 3 can be tuned by way of the selection of the temperature of the crystal 11.

The optical parametric oscillator 3 is single-resonant, that is to say it supports selectively adjustably only one boost or resonance either of the signal radiation or the idler radiation. For that purpose the mirrors 7, 8, 9 are all designed to be highly reflective in a wavelength range of 900 nm to 1300 nm. In that way they are reflective both for the signal radiation generated in the optical parametric oscillator 3 and also the idler radiation. The mirrors 7, 8 are also highly transparent, that is to say they have a low level of reflection capability for the pump wavelength of 532 nm.

The mirror 10 is a variable mirror in accordance with the present application. For that purpose the mirror is arranged on an actuator displaceably linearly and parallel to itself. The mirror 10 itself has two reflective portions on one and the same substrate. The first portion has a high reflection capability in a wavelength range of 900 nm to 1064 nm and at the same time a low transmission capability in a wavelength range of 1064 nm to 1300 nm. In comparison the second portion of the mirror has a high transmission capability in the wavelength range of 900 nm to 1064 nm and a high reflection capability for the wavelength range of 1064 nm to 1300 nm. Depending on whether the first portion or the second portion is introduced into the beam path of the signal radiation or idler radiation the resonator of the optical parametric oscillator 3 is either resonant for the signal radiation or the idler radiation. The resonator of the optical parametric oscillator 3 is formed by the mirrors 7, 8, 9 and 10.

Figure 5:
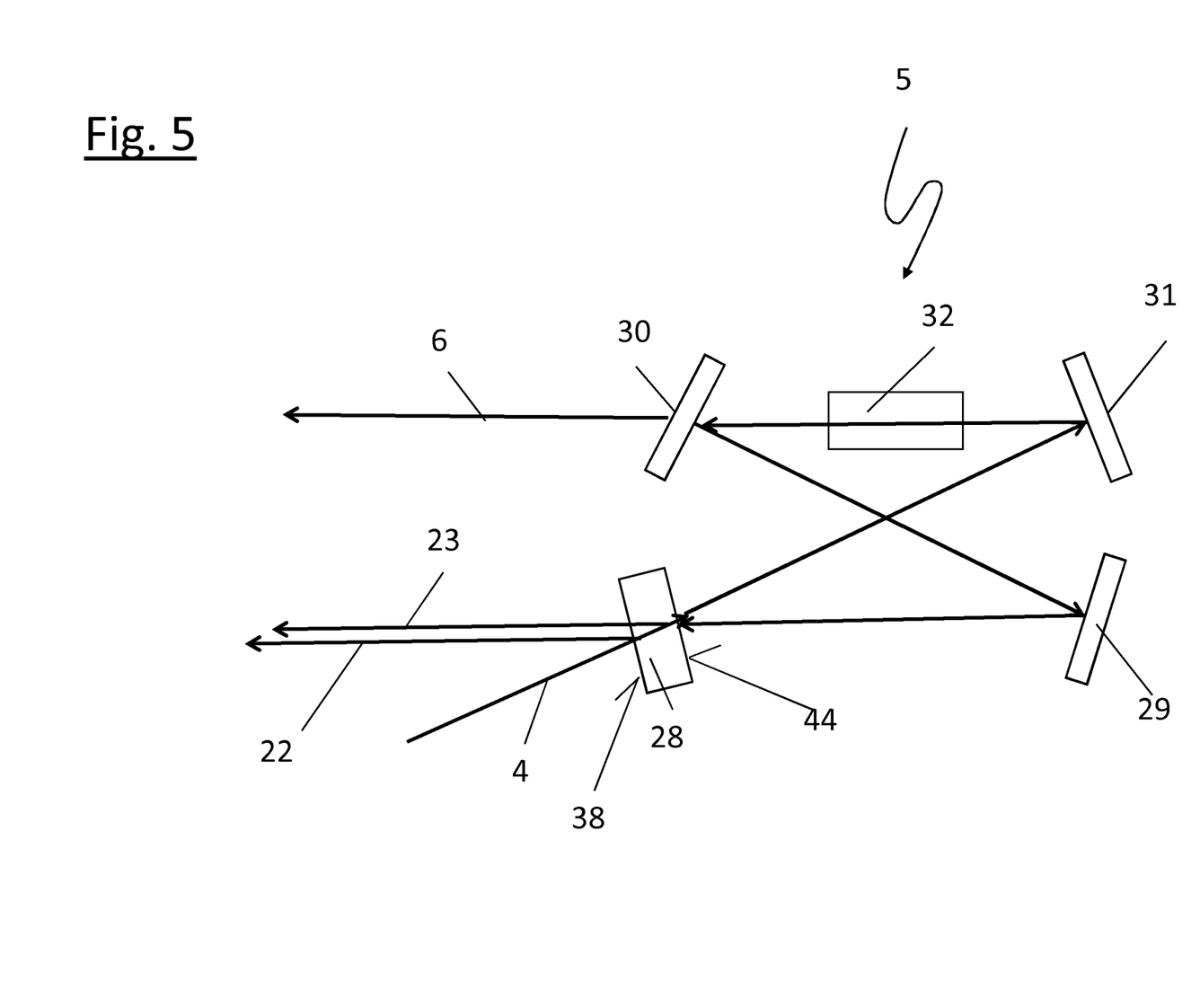
FIG. 5 shows a detail view of the frequency doubler of FIG. 1.

The signal radiation or idler radiation 4 which is not generated in boosted mode by the optical parametric oscillator 3 is coupled into the frequency doubler 5, the structure of which is shown in detail in FIG. 5. The frequency doubler 5 comprises a resonator with four mirrors 28, 29, 30, 31 and a non-linear optical lithium niobate crystal with a periodic poling with a single lattice period. The coupling-in mirror 28 for the frequency doubler 5 is partially transparent for the wavelength range of the signal radiation or idler radiation 4 of 900 nm to 1300 nm. The further resonator mirrors 29, 30, 31 are highly reflective for that wavelength range of 900 nm to 1300 nm to meet the resonance condition for signal or idler radiation. The resonator mirrors 29, 30, 31 however have at the same time a high transmission capability for the frequency-doubled (or wavelength-halved) electromagnetic radiation 6 generated in the non-linear optical crystal 32 in a wavelength range of 450 nm to 650 nm.

Figure 3:
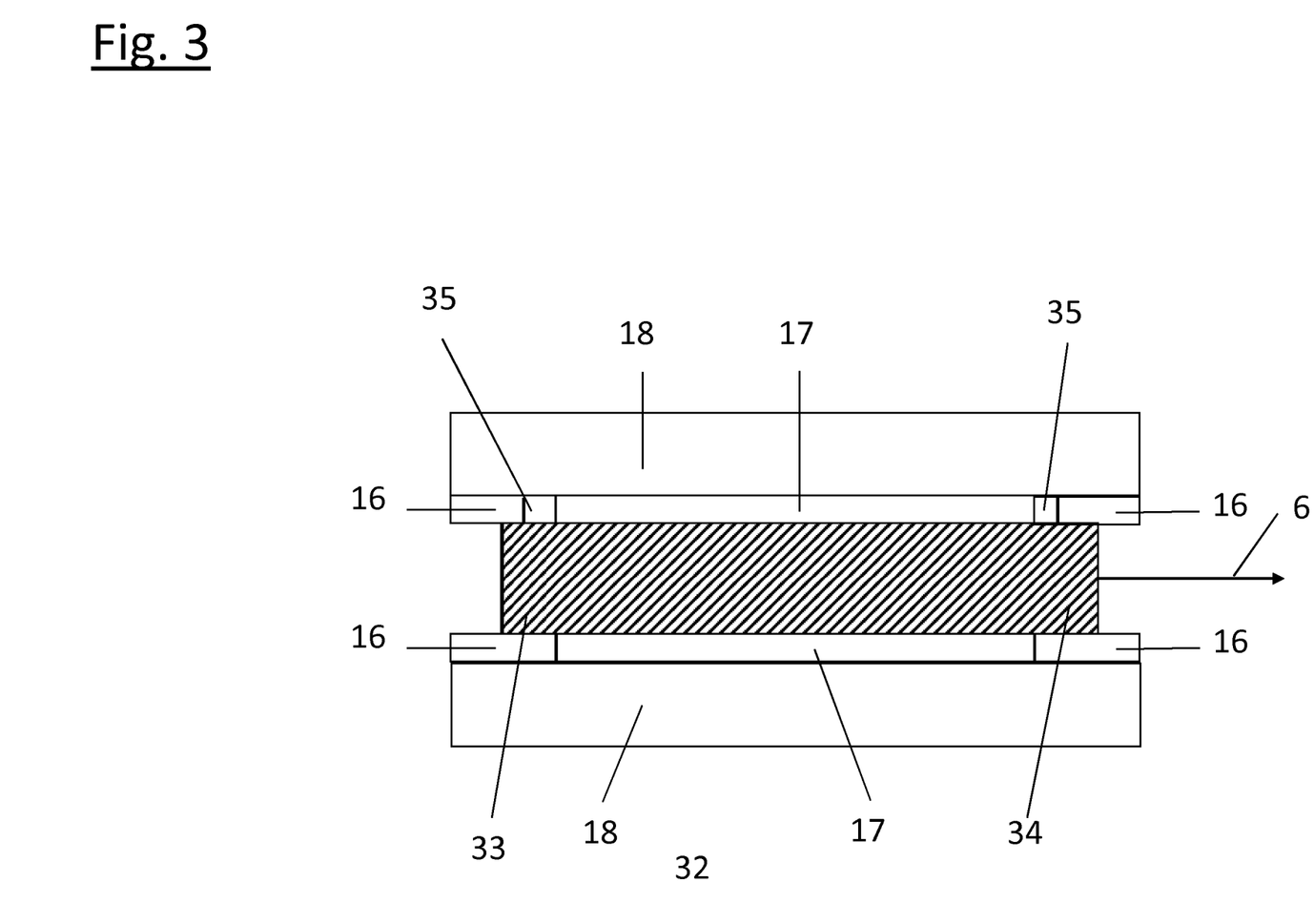
FIG. 3 shows a schematic sectional view of a furnace with a non-linear optical crystal from the frequency doubler of FIG. 1.

The non-linear optical crystal 32 is arranged in a furnace shown in detail in the sectional view in FIG. 3. That furnace serves to heat the non-linear optical crystal 32 in such a way that it has a temperature gradient in the beam direction of the radiation 6 generated in the frequency doubler 5 from its first end 33 to its second end 34, wherein the temperature gradient can be selectively adjustable by a control means (not shown).

For that purpose the furnace has a respective heating element 16 at its first end 33 and at its second end 34. When those heating elements 16 at the two ends 33, 34 of the crystal 32 are heated to different temperatures a temperature gradient is produced over the lengthwise extent of the crystal 32. The heating elements 16 are Peltier elements which are in thermal contact with the crystal 32. Provided between the heating elements 16 at the first and second ends 33, 34 are spacer portions 17 which hold the crystal at a spacing relative to an insulation 18 surrounding the crystal 32.

In addition the furnace has a temperature probe 35 at each of the ends 33, 34 of the crystal 32. That is also connected to the control means so that the temperature gradient is not only subject to open-loop control but also closed-loop control over the lengthwise extent of the crystal 32.

Adjustment of the temperature gradient makes it possible to adjust the effective length of the crystal, over which there is phase matching for a given wavelength of the signal radiation or idler radiation driving frequency doubling, from the optical parametric oscillator 3. For that purpose the control means has an interface, by way of which it receives from a control means of the optical parametric oscillator, information about the wavelength of the signal radiation or idler radiation which is generated by the optical parametric oscillator and resonantly boosted.

In this example that information is in the form of the temperature of a tempering furnace for the non-linear optical crystal 11 of the optical parametric oscillator 3. With a given periodicity of the poling of the crystal 11 the temperature of the crystal 11 establishes the wavelength of the signal radiation and idler radiation which are generated in the optical parametric oscillator 3. Depending on the wavelength of the signal radiation or idler radiation generated and passed to the frequency doubler 5 as well as the nature of the non-linear crystal 32, that is to say in particular its poling periodicity, a previously empirically established association with the temperature gradient optimising the conversion efficiency of the frequency doubler 5 can be implemented. That temperature gradient is then to be controlled by the control means.

The association between the temperature of the non-linear optical crystal in the optical parametric oscillator 3 and the optimum temperature gradient of the non-linear optical crystal 32 of the frequency doubler 5 is set down in a lookup table of a memory of the control means. The values for same are previously determined experimentally with reference to the system by measurement.

Figure 4:
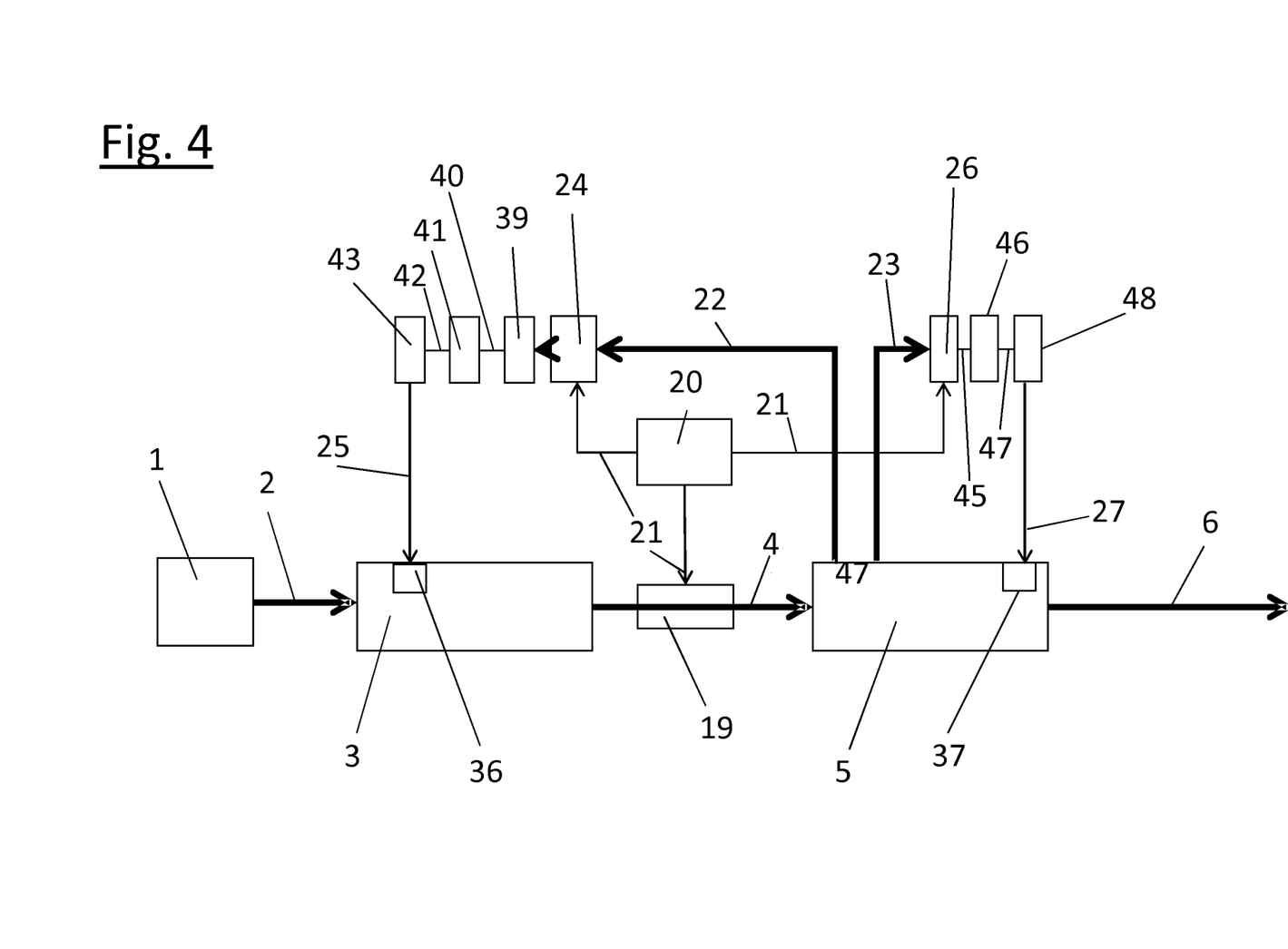
FIG. 4 shows an overview of the control circuits for stabilising the resonators of the arrangement of FIG. 1.

FIG. 4 additionally shows stabilisation of the two resonators of the optical parametric oscillator 3 and the frequency doubler 5, wherein the resonator of the optical parametric oscillator 3 is stabilised to a resonance frequency of an external Fabry-Perot etalon 24 and the resonance frequency of the resonator of the frequency doubler 5 is stabilised to the resonance frequency of the optical parametric oscillator 3.

To be able to stabilise the resonance frequencies of the two resonators a respective one of the mirrors of the resonators is mounted on an actuator 36 and 37 respectively, which permits an automated change in length of the resonator and thus regulation of its resonance frequency. For stabilisation purposes arranged between the resonators of the optical parametric oscillator 3 and the frequency doubler 5 is an electrooptical modulator 19 based on a lithium niobate crystal, which modulates the signal radiation or idler radiation generated by the optical parametric oscillator 3 with a reference frequency. That reference frequency is produced by a signal source 20 and in the illustrated embodiment is at 2 MHz. The modulator 19 thus applies to the signal radiation or idler radiation 4 sidebands which at the centre frequency have a frequency spacing equal to the reference frequency of the reference signal 21 of 2 MHz. For stabilisation of the resonator of the optical parametric oscillator 3 a part 22 of the modulated signal radiation or idler radiation is branched off upstream of the resonator of the frequency doubler 5. That is effected at an outside surface 38 of the coupling-in mirror 28 of the resonator of the frequency doubler 5. That can be diagrammatically seen in FIG. 5.

That branched-off part 22 of the signal radiation or idler radiation 4 is radiated into the temperature-stabilised Fabry-Perot etalon 24. A back reflection of the etalon 24 is detected by means of a first detector 39 and the detector signal 40 is passed to a mixer 41 which mixes the detector signal 40 with the reference signal 21 so that an error signal 42 is produced. That in turn is fed into a first proportional-differential-integral controller 43 which from the error signal generates a control signal 25 used for controlling the actuator 36 and thus for stabilisation of the resonator of the optical parametric oscillator 3 to the resonance frequency of the etalon 24.

To be able to provide for stabilisation of the resonance frequency of the resonator of the frequency doubler 5 to the resonance frequency of the resonator of the optical parametric oscillator 3 a part of the electromagnetic radiation circulating in the resonator of the frequency doubler 5, that is to say the frequency-doubled radiation 6, is also coupled out of the resonator. That is also diagrammatically shown in FIG. 5.

An inner reflecting surface 44 of the coupling-in mirror 28 serves for coupling out the radiation 23 needed for stabilisation of the second resonator. The coupled-out radiation 23 is a superimposition of the component reflected at that surface of the incident radiation with the radiation issuing from the resonator interior. That radiation is applied to a photodetector 26 producing a second detector signal 45 as a measure in respect of the intensity of the coupled-out radiation 23. That second detector signal 45 is fed into a second mixer 46 which mixes the second detector signal 45 to the reference signal 21 and produces a second error signal 47. That in turn is fed into a second proportional-differential-integral controller 48 generating a control signal 27 from the error signal. The control signal 27 serves to control the actuator 37 and thus the resonator length of the resonator of the frequency doubler 5 and to stabilise it to the resonance frequency of the resonator of the optical parametric oscillator 3.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features is dispensed with here only for the sake of brevity and readability of the description.

While the invention has been illustrated and described in detail in the drawings and the preceding description that illustration and description is only by way of example and is not deemed to be a limitation on the scope of protection as defined by the claims. The invention is not limited to the disclosed embodiments.

Modifications in the disclosed embodiments are apparent to the man skilled in the art from the drawings, the description and the accompanying claims. In the claims the word 'have' does not exclude other elements or steps and the indefinite article 'a' does not exclude a plurality. The mere fact that certain features are claimed in different claims does not exclude the combination thereof. References in the claims are not deemed to be a limitation on the scope of protection.

LIST OF REFERENCES

1 laser
2 laser beam
3 optical parametric oscillator (OPO)
4 signal radiation or idler radiation
5 frequency doubler (SHG)
6 frequency-doubled useful radiation
7 coupling-in mirror
8, 9 highly reflective mirror
10 coupling-out mirror
11 optical parametric crystal
12 signal radiation generated
13 idler radiation generated
16 heating device
17 spacer portion
18 insulation
19 electrooptical modulator (EOM)
20 signal source for the EOM
21 reference signal to the EOM
22 reflected beam portion from the outside surface 38 of the mirror 28
23 reflected beam portion from the inside surface 44 of the mirror 28
24 Fabry-Perot etalon
25 control signal for stabilisation of the OPO resonator
26 second detector for the second beam portion 23
27 control signal for the SHG resonator
28 coupling-in mirror
29, 30 highly reflective mirror
31 highly reflective mirror
32 non-linear optical crystal of the SHG
33 first end of the crystal 32
34 second end of the crystal 32
35 temperature probe
36, 37 actuator 38 outside surface of the mirror 28
39 first detector
40 first detector signal
41 first mixer
42 first error signal
43 first proportional-differential-integral controller
44 inside surface of the mirror 28
45 second detector signal
46 second mixer
47 second error signal
48 second proportional-differential-integral controller

The invention claimed is:

1. An apparatus for generating electromagnetic radiation comprising:
   a pump laser adapted to generate electromagnetic continuous-wave pump radiation;
   an optical parametric oscillator having a first non-linear optical crystal, wherein the optical parametric oscillator is arranged in a beam path of the electromagnetic continuous-wave pump radiation, and wherein the optical parametric oscillator is adapted to generate signal radiation and idler radiation from the electromagnetic continuous-wave pump radiation;
   a non-linear optical device having a second non-linear optical crystal, wherein the non-linear optical device is arranged at least in a beam path of the signal radiation or idler radiation, wherein the non-linear optical device is adapted to generate, from the signal radiation or idler radiation, electromagnetic radiation at a frequency greater than a frequency of the signal radiation or idler radiation, wherein the second non-linear optical crystal of the non-linear optical device is arranged in a furnace adapted to heat the second non-linear optical crystal in such a way that the second non-linear optical crystal has a temperature gradient in a beam propagation direction of the signal radiation or idler radiation; and
   a controller that is connected to the furnace and a temperature sensor, wherein the temperature sensor is adapted to detect a temperature of the first non-linear optical crystal of the optical parametric oscillator, and wherein the controller controls the temperature gradient of the second non-linear optical crystal of the non-linear optical device based on the temperature of the first non-linear optical crystal of the optical parametric oscillator.

2. The apparatus according to claim 1, wherein the controller controls the furnace to control the temperature gradient of the second non-linear optical crystal of the non-linear optical device based on a power and/or a wavelength of the signal radiation or idler radiation incident in the second non-linear optical crystal.

3. The apparatus according to claim 2, further comprising:
   a wavelength/frequency detector, which is connected to the controller, that detects a wavelength or frequency of the signal radiation or idler radiation.

4. The apparatus according to claim 2, wherein the controller is connected to a wavelength adjuster that adjusts the wavelength of the signal radiation or idler radiation generated by the optical parametric oscillator.

5. The apparatus according to claim 1, wherein the first non-linear optical crystal of the optical parametric oscillator is periodically poled, and
   wherein the controller controls the temperature gradient of the second non-linear optical crystal of the non-linear optical device based on the periodicity of the poling of the first non-linear optical crystal of the optical parametric oscillator.

6. The apparatus according to claim 1, wherein the furnace has a first heating element and a second heating element, and wherein the first heating element is in thermal contact with the second non-linear optical crystal at a first end of the second non-linear optical crystal in the beam propagation direction of the signal radiation or idler radiation and the second heating device is in thermal contact with the second non-linear optical crystal at a second end of the second non-linear optical crystal in the beam propagation direction.

7. The apparatus according to claim 1, wherein the furnace has a first temperature probe and a second temperature probe, wherein the first and second temperature probes are connected to the controller, wherein the first temperature probe is adapted to detect the temperature of the second non-linear optical crystal at a first end in the beam propagation direction of the signal radiation or idler radiation, and wherein the second temperature probe is adapted to detect the temperature of the second non-linear optical crystal at a second end in the beam propagation direction of the signal radiation or idler radiation.

8. The apparatus according to claim 1, wherein the non-linear optical device has a resonator having a plurality of mirrors, wherein the second non-linear optical crystal is arranged in the resonator and wherein the resonator is resonant for a wavelength of the signal radiation or idler radiation generated in the optical parametric oscillator.

9. The apparatus according to claim 1, wherein the non-linear optical device has either i) a frequency doubler that has a second non-linear optical crystal, wherein the frequency doubler is arranged in a beam path of the signal radiation or idler radiation, and wherein the frequency doubler is adapted to generate, from the signal radiation or idler radiation, electromagnetic radiation at double a frequency of the signal radiation or idler radiation, or ii) a sum frequency generator that has a second non-linear optical crystal, wherein the sum frequency generator is arranged in a beam path of the signal radiation or idler radiation and in a beam path of the electromagnetic continuous-wave pump radiation, and wherein the sum frequency generator is adapted to generate, from a) the signal radiation or idler radiation and b) the electromagnetic continuous-wave pump radiation, electromagnetic radiation at a frequency equal to the sum of 1) a frequency of the signal radiation or idler radiation and 2) a frequency of the electromagnetic continuous-wave pump radiation.

10. The apparatus according to claim 1, wherein the optical parametric oscillator and the non-linear optical device respectively have a resonator having a plurality of mirrors,
   wherein one mirror of the plurality of mirrors of each of the two resonators is moveable in driven relationship by an actuator so that lengths of the two resonators are adjustable, and
   wherein the apparatus further has a stabilizing device that stabilizes the resonator of the optical parametric oscillator and the resonator of the non-linear optical device, the stabilizing device comprising:
      an electro-optical modulator arranged between the two resonators in the beam path of the signal radiation or idler radiation;
      a signal source that produces a reference signal having a reference frequency, the reference signal fed into the electro-optical modulator such that electro-optical modulator modulates the signal radiation or idler radiation at a resonance frequency, wherein sidebands are impressed on the signal radiation or idler radiation and wherein a frequency spacing between the signal radiation or idler radiation and the sidebands is equal to the reference frequency;

a first device adapted to couple a part of the signal radiation or idler radiation out of the beam path upstream of the resonator of the non-linear optical device, wherein a wavelength reference has a resonance wavelength into which a coupled-out part of the signal radiation or idler radiation is coupled;

a first detector adapted to detect an intensity of the signal radiation or idler radiation reflected by i) the wavelength reference or ii) the signal radiation or idler radiation transmitted by the wavelength reference, the first detector outputting a first detector signal;

a first mixer into which the first detector signal and the reference signal are fed and which mixes the first detector signal with the reference signal and outputs a first error signal;

a first proportional-differential-integral controller into which the first error signal is fed and which produces a first control signal based on the first error signal, wherein the first control signal is fed into the actuator of a mirror of the plurality of mirrors of the resonator of the optical parametric oscillator so that the length of the resonator of the optical parametric oscillator is stabilized to the resonance wavelength of the wavelength reference;

a second device to couple out a part of the electromagnetic radiation circulating in the resonator of the non-linear optical device;

a second detector adapted to detect an intensity of the electromagnetic radiation coupled out of the resonator of the non-linear optical device, the second detector outputting a second detector signal;

a second mixer into which the second detector signal is fed, that mixes the second detector signal with the reference signal and outputs a second error signal; and a second proportional-differential-integral controller into which the second error signal is fed and which produces a second control signal based on the second error signal, wherein the second control signal is fed into the actuator of a mirror of the plurality of mirrors of the resonator of the non-linear optical device so that the length of the resonator of the non-linear optical device is stabilized to the resonance wavelength of the resonator of the optical parametric oscillator.

11. An apparatus for generating electromagnetic radiation comprising:

a pump laser adapted to generate electromagnetic continuous-wave pump radiation;

an optical parametric oscillator having a first non-linear optical crystal, wherein the optical parametric oscillator is arranged in a beam path of the electromagnetic continuous-wave pump radiation, and wherein the optical parametric oscillator is adapted to generate signal radiation and idler radiation from the electromagnetic continuous-wave pump radiation;

a non-linear optical device having a second non-linear optical crystal, wherein the non-linear optical device is arranged at least in a beam path of the signal radiation or idler radiation, wherein the non-linear optical device is adapted to generate, from the signal radiation or idler radiation, electromagnetic radiation at a frequency greater than a frequency of the signal radiation or idler radiation, wherein the second non-linear optical crystal of the non-linear optical device is arranged in a furnace adapted to heat the second non-linear optical crystal in such a way that the second non-linear optical crystal has a temperature gradient in the beam propagation direction of the signal radiation or idler radiation, wherein the optical parametric oscillator has a plurality of mirrors, wherein the plurality of mirrors are adapted to selectively adjustably form a resonator for the signal radiation or idler radiation, wherein the first non-linear optical crystal is arranged in a beam path of the signal radiation or idler radiation in the resonator, and wherein one mirror of the plurality of mirrors is a variable mirror that is adapted to selectively adjustably either i) a) have a reflection capability for the signal radiation greater than a reflection capability for the idler radiation, and b) at the same time have a transmission capability for the idler radiation greater than a transmission capability for the signal radiation, or ii) a) have the reflection capability for the idler radiation greater than the reflection capability for the signal radiation, and b) at the same time have the transmission capability for the signal radiation greater than the transmission capability for the idler radiation.

12. The apparatus according to claim 11, wherein the variable mirror has a first portion which has a reflection capability for the signal radiation, that is greater than the reflection capability for the idler radiation and at the same time the transmission capability for the idler radiation, that is greater than the transmission capability for the signal radiation, wherein the variable mirror has a second portion having a reflection capability for the idler radiation, that is greater than the reflection capability for the signal radiation and at the same time has the transmission capability for the signal radiation, that is greater than the transmission capability for the idler radiation, and wherein the variable mirror is mechanically moveable in such a way that either the first portion or the second portion of the variable mirror is selectively disposed in the beam path of the signal radiation and the idler radiation.

13. The apparatus according to claim 12, wherein the variable mirror is moveable along a linear path in such a way that either i) the first portion or the second portion of the variable mirror is disposed selectively in the beam path of the signal radiation and the idler radiation, or ii) the variable mirror is pivotable or rotatable about an axis of rotation in such a way that either the first portion or the second portion of the variable mirror is disposed selectively in the beam path of the signal radiation and idler radiation.

14. The apparatus according to claim 11, further comprising:

a controller that is connected to the furnace, wherein the controller controls the furnace to control the temperature gradient of the second non-linear optical crystal of the non-linear optical device based on a power and/or a wavelength of the signal radiation or idler radiation incident in the second non-linear optical crystal.

15. The apparatus according to claim 14, further comprising:

a wavelength/frequency detector, which is connected to the controller, that detects a wavelength or frequency of the signal radiation or idler radiation.

16. The apparatus according to claim 14, wherein the controller is connected to a wavelength adjuster that adjusts the wavelength of the signal radiation or idler radiation generated by the optical parametric oscillator.

17. The apparatus according to claim 11, further comprising:
a controller that is connected to the furnace,
wherein the first non-linear optical crystal of the optical parametric oscillator is periodically poled, and
wherein the controller controls the temperature gradient of the second non-linear optical crystal of the non-linear optical device based on the periodicity of the poling of the first non-linear optical crystal of the optical parametric oscillator.

18. The apparatus according to claim 11, wherein the furnace has a first heating element and a second heating element, and wherein the first heating element is in thermal contact with the second non-linear optical crystal at a first end of the second non-linear optical crystal in the beam propagation direction of the signal radiation or idler radiation and the second heating device is in thermal contact with the second non-linear optical crystal at a second end of the second non-linear optical crystal in the beam propagation direction.

19. The apparatus according to claim 11, further comprising:
a controller that is connected to the furnace,
wherein the furnace has a first temperature probe and a second temperature probe, wherein the first and second temperature probes are connected to the controller, wherein the first temperature probe is adapted to detect the temperature of the second non-linear optical crystal at a first end in the beam propagation direction of the signal radiation or idler radiation, and wherein the second temperature probe is adapted to detect the temperature of the second non-linear optical crystal at a second end in the beam propagation direction of the signal radiation or idler radiation.

20. The apparatus according to claim 11, wherein the non-linear optical device has a resonator having a plurality of mirrors, wherein the second non-linear optical crystal is arranged in the resonator, and wherein the resonator is resonant for a wavelength of the signal radiation or idler radiation generated in the optical parametric oscillator.

21. The apparatus according to claim 11, wherein the non-linear optical device has either i) a frequency doubler that has a second non-linear optical crystal, wherein the frequency doubler is arranged in a beam path of the signal radiation or idler radiation, and wherein the frequency doubler is adapted to generate, from the signal radiation or idler radiation, electromagnetic radiation at double a frequency of the signal radiation or idler radiation, or ii) a sum frequency generator that has a second non-linear optical crystal, wherein the sum frequency generator is arranged in a beam path of the signal radiation or idler radiation and in a beam path of the electromagnetic continuous-wave pump radiation, and wherein the sum frequency generator is adapted to generate, from a) the signal radiation or idler radiation and b) the electromagnetic continuous-wave pump radiation, electromagnetic radiation at a frequency equal to the sum of 1) a frequency of the signal radiation or idler radiation and 2) a frequency of the electromagnetic continuous-wave pump radiation.

22. The apparatus according to claim 11, wherein the optical parametric oscillator and the non-linear optical device respectively have a resonator having a plurality of mirrors,
wherein one mirror of the plurality of mirrors of each of the two resonators is moveable in driven relationship by an actuator so that lengths of the two resonators are adjustable, and
wherein the apparatus further has a stabilizing device that stabilizes the resonator of the optical parametric oscillator and the resonator of the non-linear optical device, the stabilizing device comprising:
an electro-optical modulator arranged between the two resonators in the beam path of the signal radiation or idler radiation;
a signal source that produces a reference signal having a reference frequency, the reference signal fed into the electro-optical modulator such that electro-optical modulator modulates the signal radiation or idler radiation at a resonance frequency, wherein sidebands are impressed on the signal radiation or idler radiation, and wherein a frequency spacing between the signal radiation or idler radiation and the sidebands is equal to the reference frequency;
a first device adapted to couple a part of the signal radiation or idler radiation out of the beam path upstream of the resonator of the non-linear optical device, wherein a wavelength reference has a resonance wavelength into which a coupled-out part of the signal radiation or idler radiation is coupled;
a first detector adapted to detect an intensity of the signal radiation or idler radiation reflected by i) the wavelength reference or ii) the signal radiation or idler radiation transmitted by the wavelength reference, the first detector outputting a first detector signal;
a first mixer into which the first detector signal and the reference signal are fed and which mixes the first detector signal with the reference signal and outputs a first error signal;
a first proportional-differential-integral controller into which the first error signal is fed and which produces a first control signal based on the first error signal, wherein the first control signal is fed into the actuator of a mirror of the plurality of mirrors of the resonator of the optical parametric oscillator so that the length of the resonator of the optical parametric oscillator is stabilized to the resonance wavelength of the wavelength reference;
a second device adapted to couple out a part of the electromagnetic radiation circulating in the resonator of the non-linear optical device;
a second detector adapted to detect an intensity of the electromagnetic radiation coupled out of the resonator of the non-linear optical device, the second detector outputting a second detector signal;
a second mixer into which the second detector signal is fed, that mixes the second detector signal with the reference signal and outputs a second error signal; and
a second proportional-differential-integral controller into which the second error signal is fed and which produces a second control signal based on the second error signal, wherein the second control signal is fed into the actuator of a mirror of the plurality of mirrors of the resonator of the non-linear optical device so that the length of the resonator of the non-linear optical device is stabilized to the resonance wavelength of the resonator of the optical parametric oscillator.

23. A method of generating electromagnetic radiation comprising the steps:
  generating electromagnetic continuous-wave pump radiation with a pump laser;
  generating signal radiation or idler radiation from the electromagnetic continuous-wave pump radiation in an optical parametric oscillator having a first non-linear optical crystal;
  generating electromagnetic radiation at a frequency greater than a frequency of the signal radiation or idler radiation from the signal radiation or idler radiation in a second non-linear optical device having a non-linear optical crystal;
  heating the second non-linear optical crystal of the non-linear optical device in a furnace so that the second non-linear optical crystal has a temperature gradient in a beam propagation direction of the signal radiation or idler radiation;
  detecting a temperature of the first non-linear optical crystal of the optical parametric oscillator; and
  controlling the temperature gradient of the second non-linear optical crystal of the non-linear optical device based on the detected temperature of the first non-linear optical crystal of the optical parametric oscillator.

24. A method of generating electromagnetic radiation comprising the steps:
  generating electromagnetic continuous-wave pump radiation with a pump laser;
  generating signal radiation or idler radiation from the electromagnetic continuous-wave pump radiation in an optical parametric oscillator having a first non-linear optical crystal;
  generating electromagnetic radiation at a frequency greater than a frequency of the signal radiation or idler radiation from the signal radiation or idler radiation in a second non-linear optical device having a non-linear optical crystal;
  heating the second non-linear optical crystal of the non-linear optical device in a furnace so that the second non-linear optical crystal has a temperature gradient in a beam propagation direction of the signal radiation or idler radiation; and
  selectively adjusting a mirror of a plurality of mirrors of the optical parametric oscillator such that the mirror of the plurality of mirrors either i) a) has a reflection capability for the signal radiation greater than a reflection capability for the idler radiation, and b) at the same time has a transmission capability for the idler radiation greater than a transmission capability for the signal radiation, or ii) a) has the reflection capability for the idler radiation greater than the reflection capability for the signal radiation, and b) at the same time has the transmission capability for the signal radiation greater than the transmission capability for the idler radiation.

* * * * *